United States Patent [19]

Nemoto

[11] Patent Number: 4,843,919

[45] Date of Patent: Jul. 4, 1989

[54] REDUCTION GEAR UNIT

[75] Inventor: Akira Nemoto, Akishima, Japan

[73] Assignee: Tachi-S Co., Ltd., Tokyo, Japan

[21] Appl. No.: 180,947

[22] Filed: Apr. 12, 1988

[51] Int. Cl.[4] ............................................. F16H 1/28
[52] U.S. Cl. ................................... 74/805; 74/804
[58] Field of Search ................................ 74/805, 804

[56] References Cited

U.S. PATENT DOCUMENTS

| 2,250,259 | 7/1941 | Foote | 74/805 |
|---|---|---|---|
| 3,429,393 | 2/1969 | Lorence | 74/805 |
| 3,955,445 | 5/1976 | Osterwalder | 74/805 |
| 4,014,224 | 3/1977 | Pitts | 74/805 |
| 4,016,780 | 4/1977 | Baranyl | 74/805 |
| 4,386,540 | 6/1983 | Skaggs | 74/805 |
| 4,604,916 | 8/1986 | Distin | 74/804 |

FOREIGN PATENT DOCUMENTS 0648861 11/1962 Italy ................................ 74/805

4948691 12/1974 Japan .

Primary Examiner—Leslie A. Braun
Assistant Examiner—Harold F. Macris
Attorney, Agent, or Firm—Browdy and Neimark

[57] ABSTRACT

A reduction gear unit which comprises a housing, an input shaft rotatably supported in the housing, an eccentric cam member integrally fixed on the input shaft, an idler gear rotatably provided around the eccentric cam member, and a drive plate member provided integrally with an output shaft member, the drive plate member being rotatably supported in a coaxial relation with the input shaft. The idler gear is formed with a first and second external teeth in such a manner that the first external teeth are partly meshed with an internally toothed portion formed in the housing, and the second external teeth are partly meshed with an internally toothed portion formed in the drive plate member. Thus, an input rotation force is reduced in a tow-fold way and transmitted in a coaxial manner.

9 Claims, 2 Drawing Sheets

REDUCTION GEAR UNIT

BACKGROUND OF THE INVENTION

1. Field of the Invention

The present invention relates to a reduction gear unit for use in various kinds of motive or or actuating mechanisms or systems.

2. Description of the Prior Art

As well known, a variety of motive or actuating mechanisms or systems for executing an intended mechanical motion are by and large equipped with a reduction gear mechanism in order to reduce the rate of a drive force generated from a drive source to thereby transform the drive force into a greater one.

Generally, the reduction gear mechanism comprises multiple combinations of plural different gears, and there as been an increased demand, in view of small-size and weight-light oriented tendency, for a simplified structure of reduction gear mechanisms with a highest possible ratio of reduction.

In the past, one of the prior attempts to attain this simplified reduction gear mechanism has been known from the Japanese Patent Publication No. 49-48691, for instance.

According to this conventional mechanism, as shown in FIG. 1, there is provided a combination of an internally toothed annular plate member (1) and externally toothed disc member (2), wherein the number of the teeth of the latter is reduced by one as compared with that of the former. Hence, it is observed that the externally toothed disc member (20) is partially meshed with the internally toothed annular plate member (1). The externally toothed disc member (2) is fixed stationary whereas the internally toothed annular plate member (1) is supported in an eccentrically rotatable manner by the eccentric rotation member (3) which comprises a rotation shaft (3a) and an eccentric ring (3b), the rotation shaft (3a) being at its one end fixed to the drive shaft of a motor (not shown), passing rotatably through the center of the externally toothed disc member (2), and being fixed at its other end fixed to the eccentric ring (3b). When the motor is energized to rotate the eccentric rotation member (3), the internally toothed annular member (1) is eccentrically rotated relative to the shaft (3a) and thus rolled around the externally toothed disc member (2) in a partially-meshed and slightly-angled relationship at the ratio of tooth number between the two toothed members (1)(2) which is obtained from the difference therebetween of the tooth numbers of one, as stated above. Thus, the rotation speed of the motor is reduced through the internally toothed annular plate member (1), and imparted as a reduced rotation output to other motive mechanism.

However, the above-constructed reduction gear mechanism has a limitation attendent therein in its adaptability for use with other relative motive mechanisms in that the internally toothed annular plate member (1) is formed in a plate-like shape, not as a shaft, and the eccentric arrangement of such plate member (1) simply imparts an eccentrical rotation as it is to other relative mechanimsms, which makes the connection difficult between this reduction gear mechanism with the gear mechanisms of other relative mechanical systems or requires a special connecting means therebetween.

Moreover, another drawback found in this prior art is that a large ratio of its input and output is not attainable because of a limit in creating a smallest possible pitches of the teeth of the two toothed members (1)(2) in view of their structural strength limits, although certainly creating the smallest pitches of the teeth of those members (1)(2) leads to a far greater ratio of input and output for a desired large reduction of drive rate.

SUMMARY OF THE INVENTION

With a view to obviating the above-stated drawback of prior art, it is therefore a purpose of the present invention to provide a reduction gear unit which offers a normal coaxial rotation in imparting a reduced output and further provides a great ratio of reduction.

In accomplishment of this purpose, the present invention comprises a housing having an internally toothed portion formed therein, an input shaft rotatably supported in the housing, which input shaft is operatively connected for its rotation, with an externally provided drive device, an eccentric cam member provided integrally with the input shaft, an idler grear which has a first externally toothed surface partly in mesh with the internally toothed portion of the housing, with the teeth of the former being reduced by one in number with respect to those of the latter, a second externally toothed surface having a smaller number of teeth than that of the first externally toothed surface, which idler gear is rotatably fitted to the eccentric cam member, a drive plate member supported in the housing in a manner coaxially rotatable relative to the input shaft, which drive plate member has an internally toothed portion, having a number of teeth greater in number by at least one with respect to that of the second externally toothed surface of the idler gear, such that the internally toothed portion of the drive plate member is partly meshed with the second externally toothed surface, a pinion gear provided integrally with the drive plate member, with its end portion projecting externally of the housing, thus constituting an output shaft.

Accordingly, the rotation of the input shaft effected by the drive device causes the eccentric rotation of the eccentric cam member, which in turn causes the rolling of the first externally toothed surface of the idler gear along the circumference of the internally toothed portion of the housing and at the same time the rolling of the second externally toothed surface of the same idler gear along the circumference of the internally toothed portion of the drive plate member, whereby the pinion gear, as an output shaft, is rotated at a reduced rate with respect to that of the input shaft. It is to be appreciated here that the idler gear is rotated at a slow rate with respect to that of the input shaft by virtue of a tooth number ratio of the first externally toothed surface of the idler gear and the internally toothed portion of the housing, which is created by the difference in the number of teeth between the former and the latter, while on the other hand, the drive plate member is rotated at a slow rate with respect to that of the idler gear by virtue of a tooth number ratio of the internally toothed portion of the drive plate member and the second externally toothed surface of the idler gear, which is created by the difference in tooth number between the former and the latter, whereupon the reduced rate of input rotation produced at the idler gear is further reduced via the drive plate member, and transmitted to the pinion gear, so as to provide twice as low a reduction in output rotation at the pinion gear as the input rotation at the input shaft.

With the above-described structure, in accordance with the present invention, the reduction gears and associated members are incorporated together as one unit in a small housing and therefore can be easily installed in other motive or actuating systems or mechanims without taking up a large space therein and without requiring a special connecting means for compensating for the eccentricity of the rotation shaft into a normal coaxial relation with other rotation shaft. Further, a reduction of input rotation is attained two times due to the meshed engagements of the first and second externally toothed surfaces of the idler gear, respectively, with the internally toothed portion of the housing and that of the drive plate member, thereby providing a far greater reduction ratio.

DETAILED DESCRIPTION OF PREFERRED EMBODIMENTS OF THE INVENTION

Figure 4:
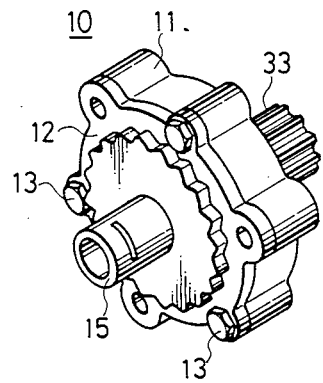
FIG. 4 is a perspective view of the same reduction gear unit, showing the assembled state thereof, as viewed from its rear side.
Figure 2:
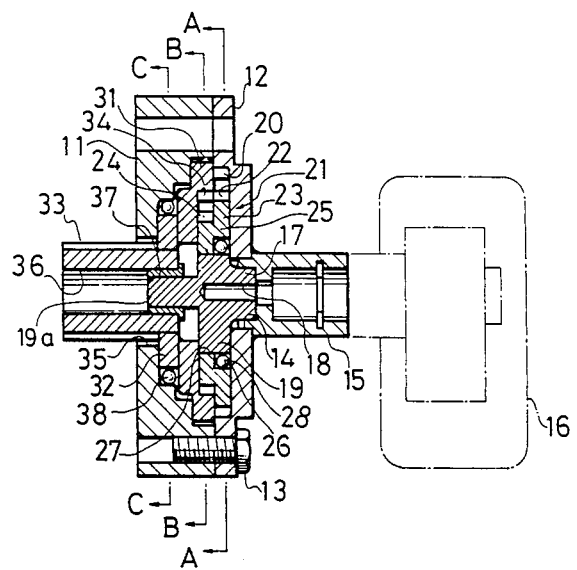
FIG. 2 is a longitudinally sectional side view of a reduction gear unit in accordance with the present invention.
Figure 3:
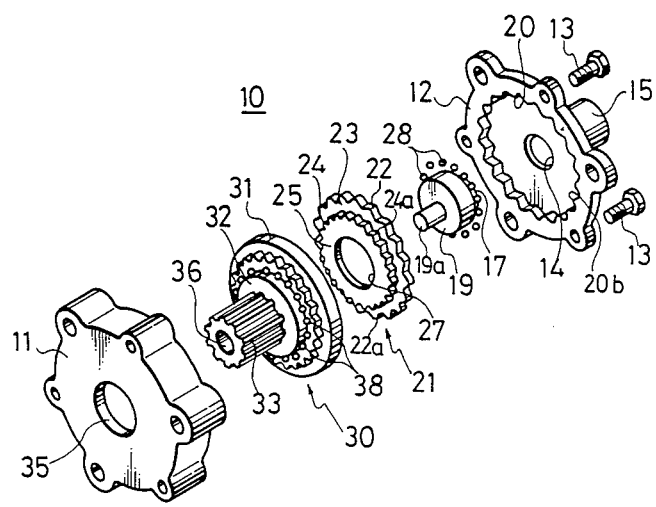
FIG. 3 is an exploded perspective view of the reduction gear unit in accordance with the present invention.

Referring to FIGS. 2 through 4, a specific description will be made of the present invention hereinafter.

A reduction gear unit to which the present invention is directed is generally designated by (10), and its housing and lid member are respectively represented by (11) and (12). Numeral (13) denotes fixing screws which fix the lid member (12) to the housing (11).

The lid member (12) has a shaft hole (14) perforated in its central portion. A cylindrical shaft support member (15) is fixed to the central portion of the lid member (12), projecting outwardly therefrom, in a coaxial relation with the shaft hole (14) of the lid member. The drive shaft (not shown) of such drive source as a motor (16) rotatably passes through the interior of the cylindrical shaft support member (15).

Interior to the housing (11), and input shaft (17) is rotatably supported at the inner end portion of the cylindrical shaft support member (15), as best seen in FIG. 2. The input shaft (17) has a connection square aperture (18) formed at its outward end portion in its axial direction, in order to receive securely therein the drive shaft of the motor (16) so that the input shaft (17) is rotated in union with the drive shaft of the motor (16) at work.

Integrally formed with the input shaft (17) is an eccentric cam member (19) of a disc type, which is disposed at a predetermined degree of eccentricity in relation to the central axis of the input shaft (17) and formed with an integral rod portion (19a) extending outwardly therefrom in a coaxial relation with the drive shaft of the motor (16). An idler gear (21) to be described later is supported on that input shaft (17).

The lid member (12) associated with the housing (11) is at its inner side formed with an internally toothed portion (20) of a circular shape in such a manner that the toothed portion (20) is formed in a circular fashion concentrically of the shaft hole (14) of the lid member (10) by means of a stamping method.

The idler gear (21), as shown, has two externally toothed surfaces; that is, it comprises a first gear member (23) having a series of first external teeth (22) formed circumferentially thereof, and a second gear member (25) having a series of second external teeth (24) formed circumferentially thereof, with the second external teeth (22) being different in number from the first external teeth (23). Both first and second gear members (23)(25) are fixed integrally together in a coaxial manner.

Of those two gear members, the first gear member (23) is arranged within the internally toothed portion (20) of the lid member (12) such that its first external teeth (22) is reduced in number by at least one with respect to the teeth of the internally toothed portion (20). Further, both first external teeth (22) and internally toothed portion (20) are so designed that the addendum circle defined by a row of the tips (22a) of the former has a smaller diameter by at least the height of its tooth than that of by the rows of the valleys (20b) of the latter. In this connection, according to the present embodiment, the first external teeth (22) of the idler gear (21) is composed of 19 teeth, whereas the internally toothed portion (20) of the lid member (12) is composed of 20 teeth.

Figure 5:
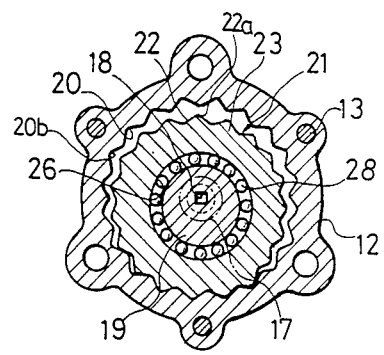
FIG. 5 is a cross-sectional view taken along the line A—A in the FIG. 2.

Centrally of the foregoing first gear member (23) of the idler gear (21), a first hole (26) is formed having a greater diameter than the outer diameter of the eccentric cam member (19), and further centrally of the foregoing second gear member (25), a second hole (27) is formed having a diameter generally equal to the outer diameter of the eccentric cam member (19), as may be best seen in FIG. 2 and 5.

Into such second hole (27), the eccentric cam member (19) is fitted, and also into the first hole (26), a plurality of steel balls (28) are introduced, whereby the idler gear (21) per se is supported on the eccentric cam member for smooth rotation within the housing (11) and the lid member (12).

It should be noted here that the eccentricity degree of the eccentric cam member (19) corresponds substantially to the difference in radius between the abovementioned addendum and deddendum circles respectively of the first external teeth (22) and the internally toothed portion (20), and thus, with such eccentricity of the cam member (29), the first external teeth (22) of the idler gear (21) is constantly urged into a part-wawy meshed engagement with the internally toothed portion (20) of the lid member (12), as shown in FIG. 5.

Within the housing (11), an output member (30) is furhter provided at the side of the second gear member (25) of the idler gear (21).

The output member (30) comprises an annular drive plate member (31) which is supported rotatably by by the housing (11) in a coaxial relation with the the input shaft (17), an annular connecting plate member (32) formed integrally with the annular drive plate member (31) coaxially relative thereto, and an pinion gear (33) integrally provided on the annular connecting plate member (32), the pinion gear (33) constituting an output shaft of the reduction gear unit (10). The drive plate member (31) is formed with an internally toothed portion (34) at a point adjacent to the connecting plate member (32), by means of a stamping method, the internally toothed portion (34) being formed in a circular shape circumscribing the second external teeth (24) of the idler gear (21) in a manner coaxial relative to the rotation center of the drive plate member (31). Thus, the second external teeth (24), namely the second gear member (25) is arranged within the internally toothed portion (34) of the drive plate member (31), as may be best seen in FIGS. 2 and 6.

The internally toothed portion (34) is so formed that its teeth are increased in number by at least one with respect to those of the second external teeth (24) of the idler gear (21). Further, both internally toothed portion (34) and second external teeth (24) are so designed that the deddendum circle defined by a row of roots or valleys (34b) of the former has a greater diameter by at least the height of its tooth than that of the addendum circle defined by a row of tips (24a) of the latter. In this connection, in the present embodiment, the internally toothed portion (34) is composed of 25 teeth, whereas, the second external teeth (24) are composed of 24 teeth.

Figure 6:
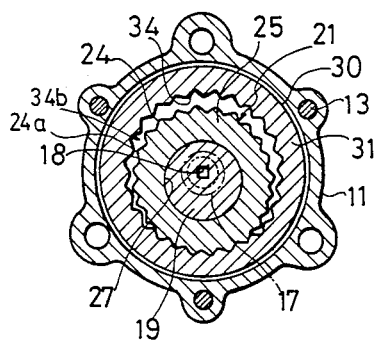
FIG. 6 is a cross-sectional view taken along the line B—B in the FIG. 2.
Figure 7:
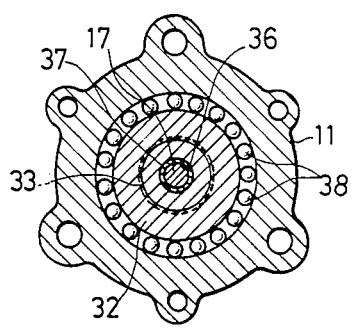
FIG. 7 is a cross-sectional view taken along the line C—C in the FIG. 2.
Figure 1:
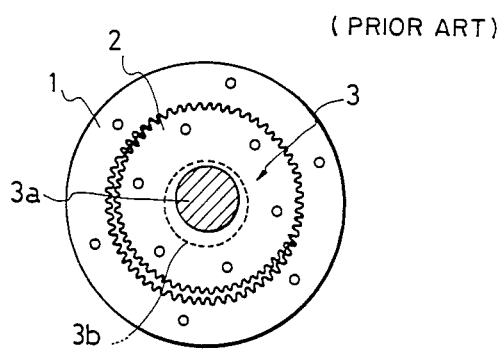
FIG. 1 is a view which shows the structure of a conventional reduction gear mechanism.

Of course, in this respect, there causes a difference in radius between those deddendum and addendum circles respectively of the internally toothed portion (34) and the second external teeth (24), and it should be noted that such a radius difference corresponds substantially to that between the above-stated addendum and deddendum circles respectively of the first external teeth (22) and the internally toothed portion (20), and therefore also substantially corresponds to the eccentricity degree of the eccentric cam member (29). Accordingly, it is seen that the second external teeth (24) of the idler gear (21), by virtue of the eccentricity of the cam member (29) are constantly urged into a part-way meshed engagement with the internally toothed portion (34) of the drive plate member (31), as shown in FIG. 6.

The pinion gear (33) extends through a hole (35) perforated in the center of the housing (11) to project its forward end portion outwardly thereof, and in the pinion gear (33), a through bore (36) along is formed its central axis direction. At the inner end portion of the through bore (36), the rod portion (19a) of the eccentric cam member (19) is rotatably via a bush (37), as shown in FIG. 2.

Between the outer circumferential surface of the connecting plate member (32) and the inner corresponding wall of the housing (11), there are introduced a plurality of steel balls (38) so as to facilitate the rotation of the output member (30) per se within the housing (11).

Now, description will be given below in regard to the operation of the above-described reduction gear unit.

When the motor (16) is energized to give a drive force to the input shaft (17) for rotation, the eccentric cam member (19) integral with the input shaft (17) is caused to rotate eccentrically relative to the central axis of the input shaft (17), thereby causing a corresponding eccentric rotation of the idler gear (21). With such eccentric rotation of the idler gear (21), the first external teeth (22) thereof are rolled along the internally toothed portion (20) of the housing (11) in a part-way mesh therewith. Accordingly, the first gear member (23) is rotated relative to the input shaft (17) at a small amount defined by a tooth number ratio of the first gear member (23) and the internally toothed portion (20) during one round of rolling of the former along the latter (i.e. during one round of rotation of the input shaft (17)), whereupon the first gear member (23) of the idler gear (21) is rotated eccentrically at a reduced rate with respect to the rotation of the input shaft (17). This reduced eccentric rotation is transmitted to the adjacent second gear member (25) of the same idler gear (21), so that the second external teeth (24) thereof are rolled along the the internally toothed portion (34) of the annular drive plate member (30) in a part-way mesh therewith. Thus, the annular drive plate member (30) is rotated relative to the second gear member (25) at a small amount defined by a tooth number ratio of the internally toothed portion (34) and the second external teeth (24) during one round of rolling of the second gear member (25) alon the internally toothed portion (34) (i.e. during one round of rotation of the idler gear (21)), whereupon the previously reduced rate of rotation of the idler gear (21) is further reduced and transmitted to the output member (30).

It is therefore appreciated that the initial rotation rate of the input shaft (17) is reduced at two steps down to a lower and lower degree, and transmitted to the pinion gear (33) for providing an extremely reduced output rotation.

This reduction of rotation rate can be expressed by a ratio of the roration rate at the input shaft (17) and that at the pinion gear (33). Such reduction ratio is formulated by the following formula:

$$\frac{Z_1 - Z_2}{Z_1} \cdot \frac{Z_4 - Z_3}{Z_4}$$

wherein,
$Z_1$ is the tooth number of the internally toothed portion (20) of the housing (11);
$Z_2$ is the tooth number of the first external teeth (22) of the idler gear (21);
$Z_3$ is the tooth number of the second external teeth (24) of the idler gear (21); and
$Z_4$ is the tooth number of the internally toothed portion (34) of the annular drive plate member (31).

Hence, in the present embodiment, as $Z_1$ is 20, $Z_2$ is 19, $Z_3$ is 24, and $Z_4$ is 25, the reduction ratio of the pinion gear (33) to the input shaft (17) is obtained by means of the abovementioned formula as "1/100", which means that the pinion gear (33) is rotated one round when the input shaft (17) is rotated one hundred rounds, thus offering a far greater ratio of reduction.

While having described the present invention as above, the following alterations may be made:

(1) Instead of the two gear members (22)(24) integrally fixed together, the similar two gear portions may be defined on one single plate by means of stamping method.

(2) The teeth numbers respectively of the internally toothed portion (20), the first and second external teeth (22)(24) of the idler gear (21), and the internally toothed portion (34) of the drive plate member (31), are not limited to the aforementioned tooth number, but may be varied depending on a required reduction ratio.

(3) As an output shaft, the pinion gear (33) is employed, but other normal shafts or the like may be utilized for connection with various kinds of other motive or actuating mechanisms or systems.

Further, it should be understood that the present invention is not limited to the present embodiment, but other replacements, modifications and additions may structurally be possible without departing from the spirits and scope of the appended claims for the invention.

From the descriptions above, it will be clearly appreciated that in accordance with the present invention, the reduction gear mechanisms are incorporated together within a small housing to present a simple reduction gear unit, which permits easy installation of the unit per se in other motive or actuating mechanisms without taking up any large space, and that the two-fold reduction is effected through the part-way meshed engagement of the first gear member (23) with the internally toothed portion (20) of the housing (11) and that of the second gear member (25) with the internally toothed portion (34) of the drive plate member (31), thereby providing a far greater ratio of reduction than the previously stated prior art.

In addition, in accordance with the present invention, both input shaft (17) and pinion gear (33) are arranged in a coaxial relation with each other, and thereofore, an input rotation force is reduced and transmitted in coaxial direction to the pinion gear (33) so as to give a reduced rate of output rotation force without any eccentric manner in contrast to the previously stated prior art. Thus, the reduction gear unit (1) in accordance with the present invention can readily be connected with a relevant connecting shaft of other motive or actuating systems without requiring a special connecting means, and as such as widely adaptable for use with varieties of motive or actuating systems or mechanisms.

What is claimed is:

1. A reduction gear unit comprising:
    a housing;
    an input shaft rotatably supported in said housing, said input shaft being connectable with a drive source provided externally of said reduction gear unit;
    an eccentric cam member provided integrally on said input shaft;
    an internally toothed portion formed in an inner side of said housing having a set of teeth;
    an idler gear fitted around said eccentric cam member, said idler gear having a first set of external teeth having a number of teeth which is reduced by at least one with respect to the number of teeth of said internally toothed portion of said housing, said first set of external teeth being in a part-way meshed engagement with said internally toothed portion of said housing, and a second set of external teeth having a number of teeth which is different from that of said first set of external teeth, said idler gear comprising a first gear member having a first set of external teeth and a second gear member having a second set of external teeth having a number of teeth which is different from that of said first set of external teeth of said first gear member, wherein said first and second gear members are fixed integrally together in a coaxial manner, said first gear member of said idler gear having a hole formed at its central portion having a greater diameter than outer diameter of said eccentric cam member, and said second gear member of said idler gear having a hole formed at its central portion having a diameter substantially equal to outer circumference of said eccentric cam member;
    a drive plate member rotatably supported in said housing in a coaxial relation with said input shaft, said drive plate member being formed with an internally toothed portion having a number of teeth which is increased by at least one with respect to the number of teeth of said second set of external teeth of said idler gear, said internally toothed portion being in a part-away meshed engagement with said second set of external teeth of said idler gear; and
    an output shaft member integrally on said drive plate member such that a forward end portion of said output shaft member projects outwardly of said housing.

2. The reduction gear unit according to claim 1, wherein said housing includes a lid member fixed thereto by means of plural screws, and wherein said lid member is at its inner wall formed with said internally toothed portion.

3. The reduction gear unit according to claim 1, wherein said cam member is fitted in said hole of said second gear member, and a plurality of steel balls are provided between said hole of said first gear member and corresponding circumference surface of said eccentric cam member, whereby said idler gear is supported on said eccentric cam member in a rotatable manner.

4. The reduction gear unit according to claim 1, wherein said output shaft member passes through a hole perforated centrally of said housing to project its forward end outwardly of said housing, wherein said output shaft member has a through bore formed therein along its central axis direction, and wherein said input shaft is at its forward end supported in an inner portion of said through bore of said output shaft member in a rotatable manner.

5. The reduction gear unit according to claim 1, wherein said output shaft member comprises a pinion gear, and wherein said pinion gear is integrally fixed with said drive plate member coaxially with said drive plate member.

6. The reduction gear unit according to claim 1, wherein an addendum circle of said first set of teeth of said idler gear has a smaller diameter by at least height of tooth than that of a deddendum circle of said internally toothed portion of said housing.

7. The reduction gear unit according to claim 1, wherein said internally toothed portion of said drive plate member is formed in a circular shape circumscribing said second set of external teeth of said idler gear and concentrically relative to said drive plate member, and wherein a deddendum circle of said internally toothed portion of said drive plate member has a greater diameter by at least the height of the teeth than that of an addendum circle of said second set of external teeth of said idler gear.

8. The reduction gear unit according to claim 1, wherein a degree of eccentricity of said eccentric cam member substasntially corresponds to a difference in radius between a deddendum circle of said internally toothed portion of said housing and an addendum circle of said first set of external teeth of said idler gear, whereby said first set of external teeth of said idler gear is constantly kept in a part-way meshed engagement with said internally toothed portion of said housing, and wherein a difference in radius between a deddendum circle of said internally toothed portion of said drive plate member and an addendum circle of said second set of external teeth of said idler gear substantially corresponds to said degree of eccentricity of said eccentric cam member, whereby said second set of external teeth of said idler gear is constantly kept in a part-way meshed engagement with said internally toothed portion of said drive plate member.

9. The reduction gear unit according to claim 1, wherein there is formed a connecting plate member between said drive plate member and said output shaft member in an integral manner, and wherein a plurality of steel balls are provided between an outer circumerence surface of said connecting plate member and a corresponding inner surface of said housing.

* * * * *